(12) United States Patent
Salter et al.

(10) Patent No.: US 11,872,940 B2
(45) Date of Patent: Jan. 16, 2024

(54) VEHICLE BODY MOUNTED SIDE VIEW MIRROR ASSEMBLIES WITH OFF-ROADING AND VEHICLE SECURITY FEATURES

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Jeffrey Robert Seaman, Brownstone, MI (US); Paul Kenneth Dellock, Northville, MI (US); Annette Lynn Huebner, Highland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 495 days.

(21) Appl. No.: 17/152,924

(22) Filed: Jan. 20, 2021

(65) Prior Publication Data

US 2022/0227295 A1    Jul. 21, 2022

(51) Int. Cl.

| | |
|---|---|
| *B60R 1/08* | (2006.01) |
| *B60R 1/12* | (2006.01) |
| *B60K 13/06* | (2006.01) |
| *B60K 13/02* | (2006.01) |
| *B60R 1/02* | (2006.01) |
| *B60R 1/06* | (2006.01) |
| *B60R 1/072* | (2006.01) |
| *B60R 1/074* | (2006.01) |

(Continued)

(52) U.S. Cl.
CPC .............. *B60R 1/081* (2013.01); *B60K 13/02* (2013.01); *B60K 13/06* (2013.01); *B60R 1/025* (2013.01); *B60R 1/0612* (2013.01); *B60R 1/072* (2013.01); *B60R 1/074* (2013.01); *B60R 1/078* (2013.01); *B60R 1/08* (2013.01); *B60R 1/12* (2013.01); *B60R 1/1207* (2013.01); *G02B 5/08* (2013.01); *B60R 2001/1223* (2013.01); *B60R 2001/1253* (2013.01); *B60R 2300/8046* (2013.01)

(58) Field of Classification Search
CPC .............. B60R 1/08; B60R 1/081; G02B 5/08
USPC ................. 296/1.11; 359/850, 865, 871, 872
See application file for complete search history.

(56) References Cited

U.S. PATENT DOCUMENTS

| | | | | |
|---|---|---|---|---|
| 6,290,361 B1 * | 9/2001 | Berzin | ..................... | B60S 1/544 |
| | | | | 359/507 |
| 7,293,888 B2 * | 11/2007 | Hutzel | ..................... | B60R 1/04 |
| | | | | 359/838 |

(Continued)

FOREIGN PATENT DOCUMENTS

| | | | | | |
|---|---|---|---|---|---|
| CN | 107672527 A | * | 2/2018 | ............. | B60R 1/083 |
| CN | 108068700 A | * | 5/2018 | ............... | B60R 1/00 |

(Continued)

*Primary Examiner* — Dennis H Pedder
(74) *Attorney, Agent, or Firm* — Vichit Chea; Carlson, Gaskey & Olds, P.C.

(57) ABSTRACT

This disclosure details vehicle static body structure mounted side view mirror assemblies. The exemplary side view mirror assemblies may include features for supporting vehicle off-roading, such as a pivoting and telescoping mirror section, a wind wing, lighting features, snorkel features, and/or accessory mounts, etc. The exemplary side view mirror assemblies may also include features for supporting improved vehicle security, such as mirror mounted radar sensors capable of establishing a security protection zone about the vehicle.

20 Claims, 8 Drawing Sheets

(51) Int. Cl.
*B60R 1/078* (2006.01)
*G02B 5/08* (2006.01)

(56) References Cited

U.S. PATENT DOCUMENTS 7,621,588 B2   11/2009   Zhu et al.
2020/0156592 A1   5/2020   Zaharia

FOREIGN PATENT DOCUMENTS

| FR | 2724142 | * | 3/1996 | | |
|----|---------|---|--------|---|---|
| GB | 2455735 | A | 6/2009 | | |
| JP | 55145039 | A * | 11/1980 | ............. | B60R 1/078 |
| JP | 2004142660 | A | 5/2004 | | |
| JP | 2004535981 | A * | 12/2004 | ............. | B60R 1/081 |
| KR | 200394567 | Y1 * | 9/2005 | ............... | B60R 1/08 |

* cited by examiner

VEHICLE BODY MOUNTED SIDE VIEW MIRROR ASSEMBLIES WITH OFF-ROADING AND VEHICLE SECURITY FEATURES

TECHNICAL FIELD

This disclosure relates to side view mirrors for motor vehicles, and more particularly to vehicle static body structure mounted side view mirror assemblies that include various accessory features for supporting off-roading and improved vehicle security.

BACKGROUND

Vehicle side view mirrors are typically mounted to driver and passenger side doors. Vehicles designed for off-road use often provide for the removal of the driver and passenger side doors. Removal of the side doors typically results in also removing the side view mirrors.

SUMMARY

A side view mirror assembly for a vehicle according to an exemplary aspect of the present disclosure includes, among other things, a stationary mirror housing section mounted to a vehicle static body structure and including a first mirror and a movable mirror housing section movably mounted to the stationary mirror housing section and including a second mirror. The movable mirror housing section is movable between a first, on-road driving position and a second, off-road driving position relative to the stationary mirror housing section.

In a further non-limiting embodiment of the foregoing side view mirror assembly, a bracket located at a base of the stationary mirror housing section is mounted at a first portion of the vehicle static body structure and an upper section of the stationary mirror housing section is mounted at a second portion of the vehicle body static structure.

In a further non-limiting embodiment of either of the foregoing side view mirror assemblies, the movable mirror housing section is movably mounted to the stationary mirror housing section by a pivotable and telescoping arm.

In a further non-limiting embodiment of any of the foregoing side view mirror assemblies, the movable mirror housing section includes a third mirror, and the third mirror is forward facing when the movable mirror housing section is positioned in the first, on-road driving position and establishes a lower, rear-facing mirror of the stationary mirror housing section when the movable mirror housing section is positioned in the second, off-road driving position.

In a further non-limiting embodiment of any of the foregoing side view mirror assemblies, a top surface of the stationary mirror housing section establishes an accessory mounting platform that includes a plurality of mounting openings.

In a further non-limiting embodiment of any of the foregoing side view mirror assemblies, a snorkel intake duct is attached to the stationary mirror housing section. The snorkel intake duct is in fluid communication with an air intake opening formed in the stationary mirror housing section.

In a further non-limiting embodiment of any of the foregoing side view mirror assemblies, a wind wing is slidably mounted to the stationary mirror housing section.

In a further non-limiting embodiment of any of the foregoing side view mirror assemblies, a turn signal repeater or a floodlight is provided on the stationary mirror housing section or the movable mirror housing section.

In a further non-limiting embodiment of any of the foregoing side view mirror assemblies, a spotlight and a camera are provided on the movable mirror housing section.

In a further non-limiting embodiment of any of the foregoing side view mirror assemblies, a radar sensor is provided on the movable mirror housing section.

In a further non-limiting embodiment of any of the foregoing side view mirror assemblies, the vehicle static body structure includes an A-pillar, a hinge pillar, a fender support, and a cowl structure, and the side view mirror assembly is mounted at joint interface between the A-pillar, the hinge pillar, the fender support, and the cowl structure.

In a further non-limiting embodiment of any of the foregoing side view mirror assemblies, a bracket located at a base of the stationary mirror housing section is mounted at the joint interface, and an upper section of the stationary mirror housing section is mounted to the A-pillar.

A method according to another exemplary aspect of the present disclosure includes, among other things, monitoring a perimeter located outside of a vehicle with a radar sensor of a side view mirror assembly that is mounted to a vehicle static body structure of the vehicle.

In a further non-limiting embodiment of the foregoing method, the monitoring is performed when the vehicle is in park and in a doors-off condition.

In a further non-limiting embodiment of either of the foregoing methods. the monitoring includes establishing at least a portion of a security protection zone about the vehicle.

In a further non-limiting embodiment of any of the foregoing methods, the monitoring is performed when the vehicle is in park.

In a further non-limiting embodiment of any of the foregoing methods, the monitoring includes establishing at least a portion of a security protection zone about a campsite or tailgating site adjacent to the vehicle.

In a further non-limiting embodiment of any of the foregoing methods, establishing the portion of the security protection zone includes receiving an input of a plurality of perimeter points that establish an outer perimeter of the security protection zone.

In a further non-limiting embodiment of any of the foregoing methods, the side view mirror assembly includes a stationary mirror housing section mounted to the vehicle static body structure and including a first mirror and a movable mirror housing section movably mounted to the stationary mirror housing section and including a second mirror.

In a further non-limiting embodiment of any of the foregoing methods, the movable mirror housing section is movable between a first, on-road driving position and a second, off-road driving position relative to the stationary mirror housing section.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle static body structure mounted side view mirror assemblies. The exemplary side view mirror assemblies may include features for supporting vehicle off-roading, such as a pivoting and telescoping mirror section, a wind wing, lighting features, snorkel features, and/or accessory mounts, etc. The exemplary side view mirror assemblies may also include features for supporting improved vehicle security, such as mirror mounted radar sensors capable of establishing a security protection zone about the vehicle. These and other features of this disclosure are described in greater detail below.

Figure 1:
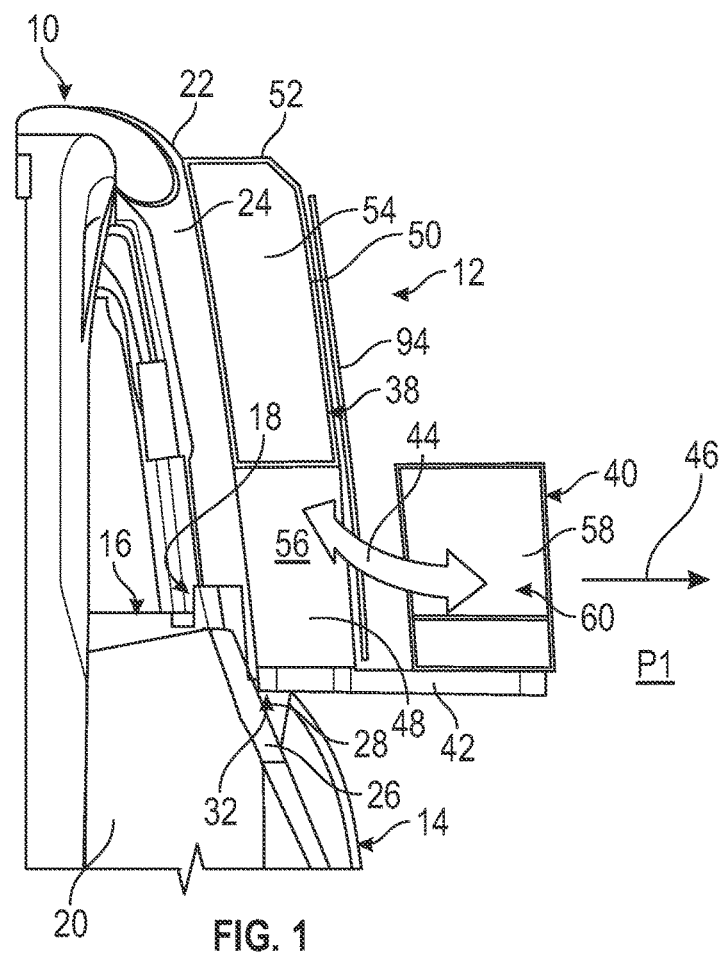
FIG. 1 illustrates portions of a motor vehicle equipped with a side view mirror assembly. The side view mirror assembly is shown positioned in an on-road driving position.
Figure 2:
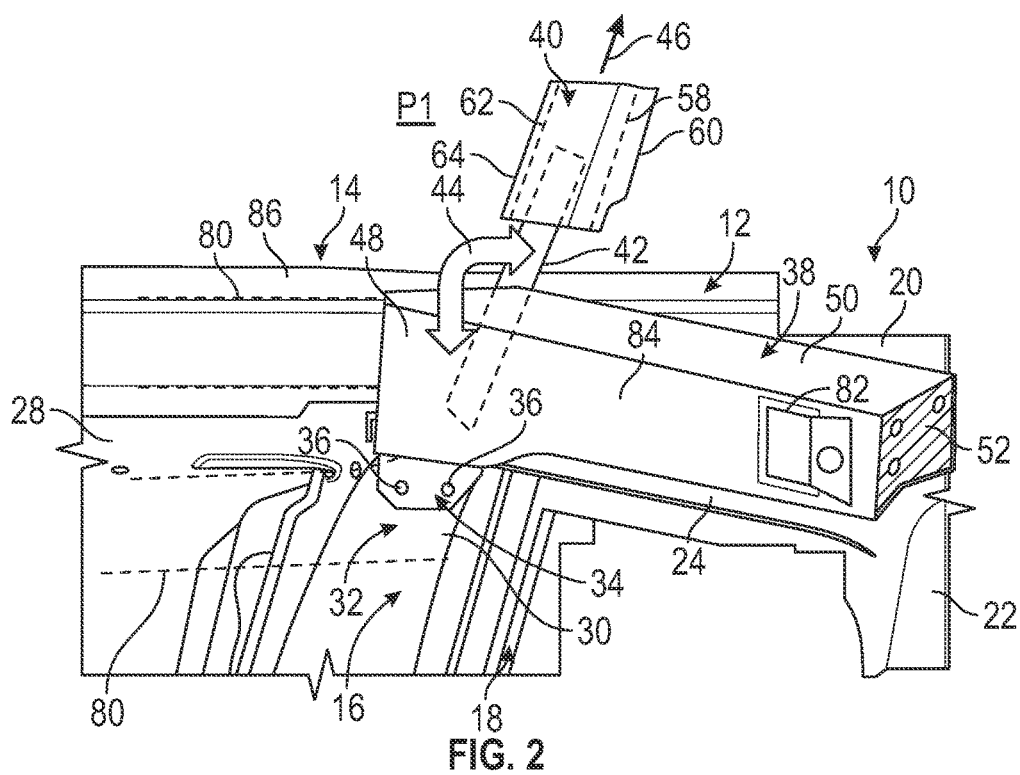
FIG. 2 is a top view of the exemplary side view mirror assembly of FIG. 1.
Figure 3:
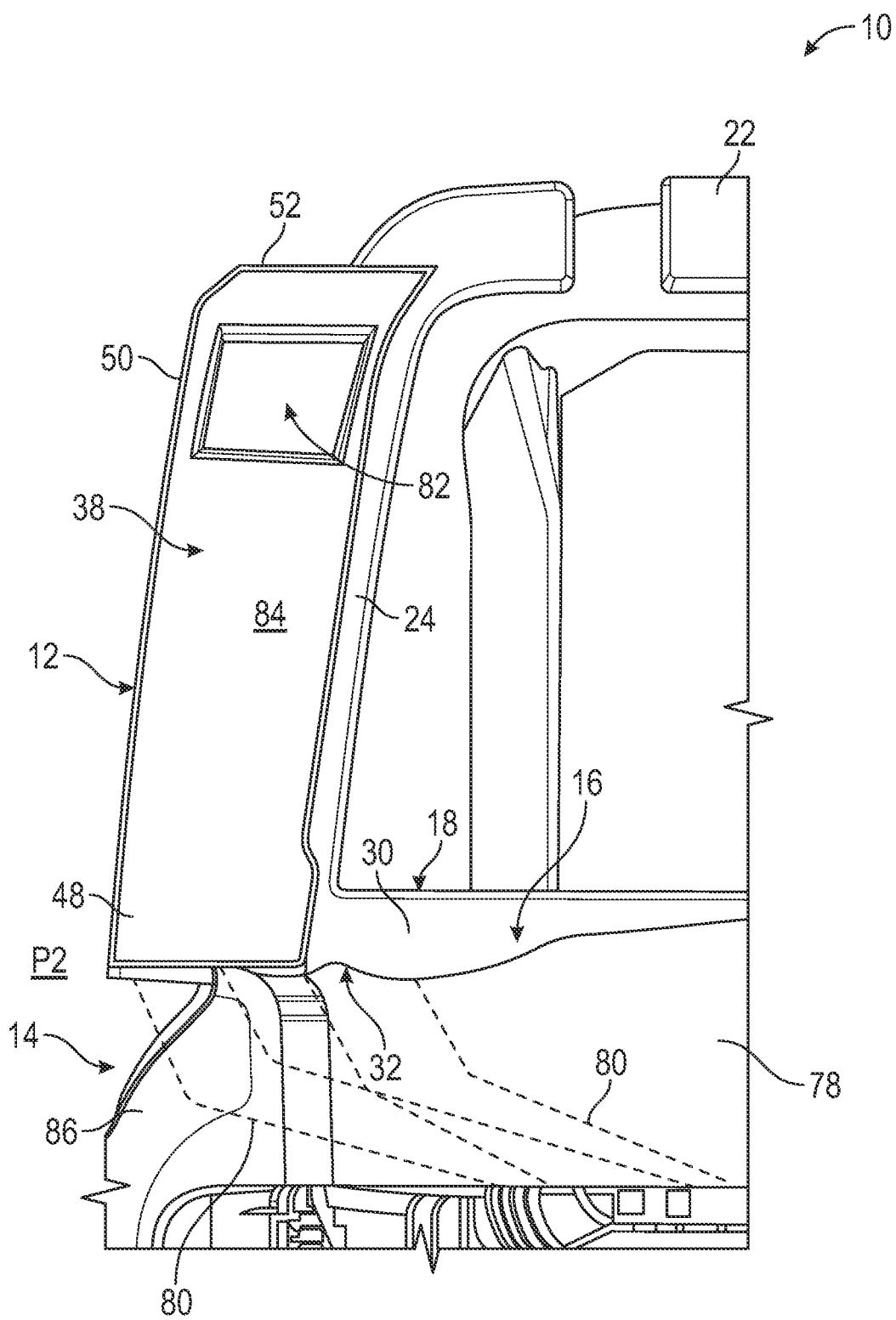
FIG. 3 illustrates the side view mirror assembly positioned in an off-road driving position.

FIGS. 1-3 illustrate select portions of a motor vehicle 10. In an embodiment, the vehicle 10 is a sport utility vehicle (SUV). However, the teachings of this disclosure may also be applicable to trucks, cars, vans, or any other type of motor vehicle. The vehicle 10 could also be a conventional motor vehicle, a traction battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be either exaggerated or minimized to emphasize certain details of a particular component.

The vehicle 10 may include a side view mirror assembly 12. In the illustrated embodiment, the side view mirror assembly 12 is located on a passenger side 14 of the vehicle 10. An additional side view mirror assembly (not shown in FIGS. 1-3) may be located on a driver side of the vehicle 10, and the additional side view mirror assembly could include an identical design or a different design than the side view mirror assembly 12.

The side view mirror assembly 12 is mounted to a vehicle static body structure 18 instead of a side door 20 of the vehicle 10. The side doors 20 of the vehicle 10 may be removed from the vehicle static body structure 18 to provide an open-air driving and riding experience. Door mounted side view mirrors are of course removed along with the side doors 20. The exemplary side view mirror assemblies 12 of this disclosure may be mounted to structural vehicle body components within a leaf screen area 16 of the vehicle 10. Accordingly, each side view mirror assembly 12 remains mounted to the vehicle 10 even when the side doors 20 of the vehicle 10 are removed, such as during off-road driving events, for example.

The vehicle static body structure 18 may include portions of an A-pillar 24, a hinge pillar 26, a fender support 28, and a cowl structure 30. In an embodiment, the side view mirror assembly 12 is mounted to the vehicle static body structure 18 at a joint interface 32 between the A-pillar 24, the hinge pillar 26, the fender support 28, and the cowl structure 30. Portions of the side view mirror assembly 12 may also be secured along the A-pillar 24. However, the side view mirror assembly 12 could be attached at other locations of the vehicle static body structure 18, such as entirely on the A-pillar 24, the hinge pillar 26, the fender support 28, the cowl structure 30, a roof header 22, etc. Although parts of the vehicle static body structure 18 are disclosed by way of example, the side view mirror assembly 12 of FIGS. 1-3 could be attached to any portion of the vehicle static body structure 18.

A bracket 34 (see FIG. 2) of the side view mirror assembly 12 may be mounted to the vehicle static body structure 18, such as at the joint interface 32. One or more fasteners 36, such as screws or bolts, may be used to secure the bracket 34 at the joint interface 32.

The side view mirror assembly 12 may include a stationary mirror housing section 38 and a movable mirror housing section 40. The movable mirror housing section 40 is movably connected to the stationary mirror housing section 38 by an arm 42. The arm 42 may be both pivotable and extendable (i.e., telescoping) relative to the stationary mirror housing section 38.

The movable mirror housing section 40 is movable between a first, on-road driving position P1 (see FIGS. 1 and 2) and a second, off-road driving position P2 (see FIG. 3) relative to the stationary mirror housing section 38. In the first position P1, the movable mirror housing section 40 is extended from the stationary mirror housing section 38 into a stock mirror position suitable for normal, on-road driving conditions. In the second position P2, the movable mirror housing section 40 is retracted into a stowed position relative to the stationary mirror housing section 38 for off-road driving conditions. The side view mirror assembly 12 is contained within the fender width of the vehicle 10 when the movable mirror housing section 40 is retracted into the second position P2, thereby providing a relatively low off-road profile that is more conducive to off-road driving.

In an embodiment, the movable mirror housing section 40 is pivoted between the first and second positions P1, P2 via the arm 42 as schematically depicted by arrow 44. In another embodiment, the movable mirror housing section 40 is extended away from or moved toward the stationary mirror housing section 38 by telescoping the arm 42 as schematically depicted by arrow 46.

The bracket 34 is configured to support a base 48 of the stationary mirror housing section 38 at the joint interface 32. The bracket 34, and thereby the side view mirror assembly 12, may be removed from the vehicle static body structure 18 for service or maintenance as needed.

Figure 4:
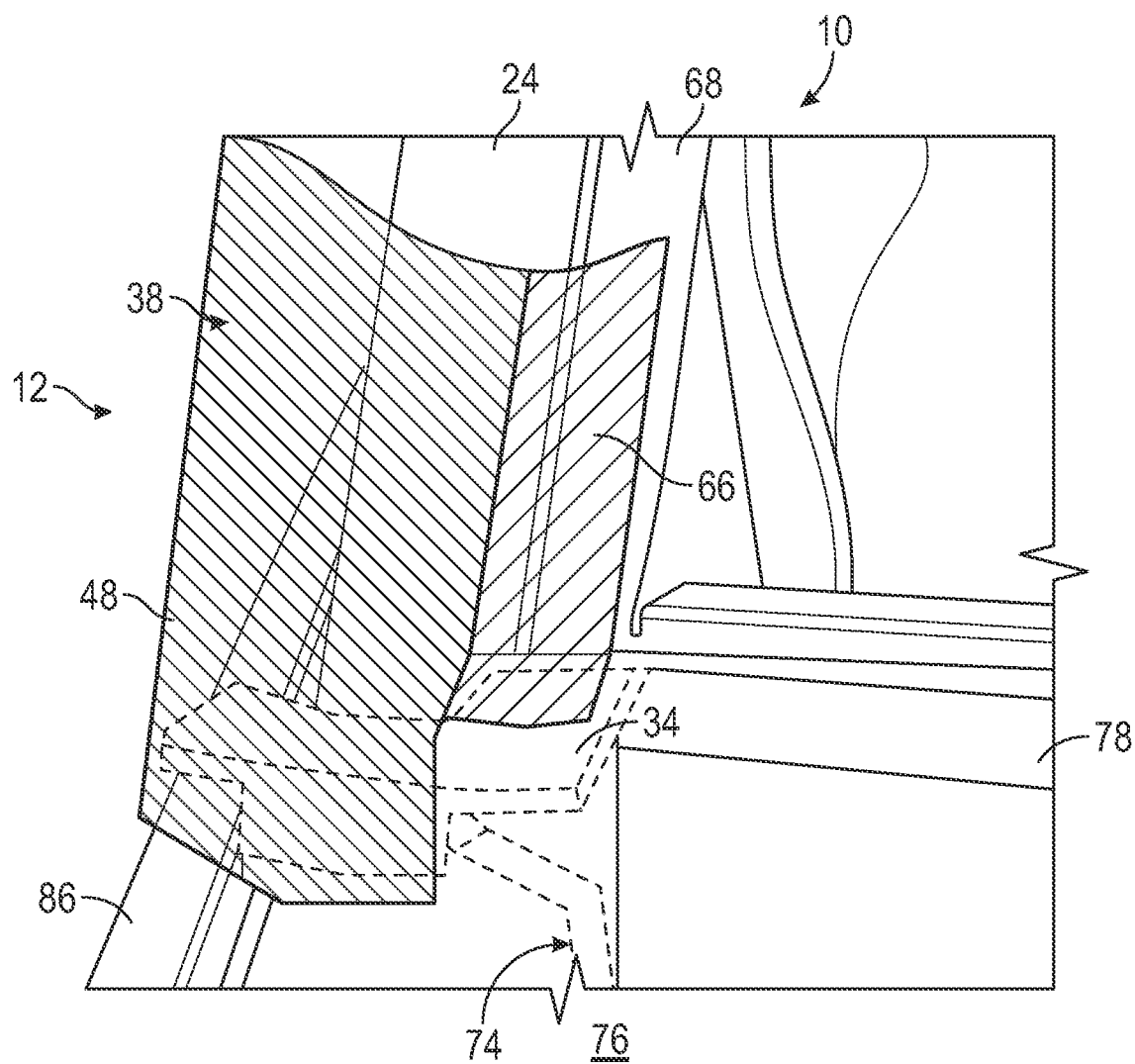
FIG. 4 illustrates an exemplary mounting configuration of a side view mirror assembly.
Figure 5:
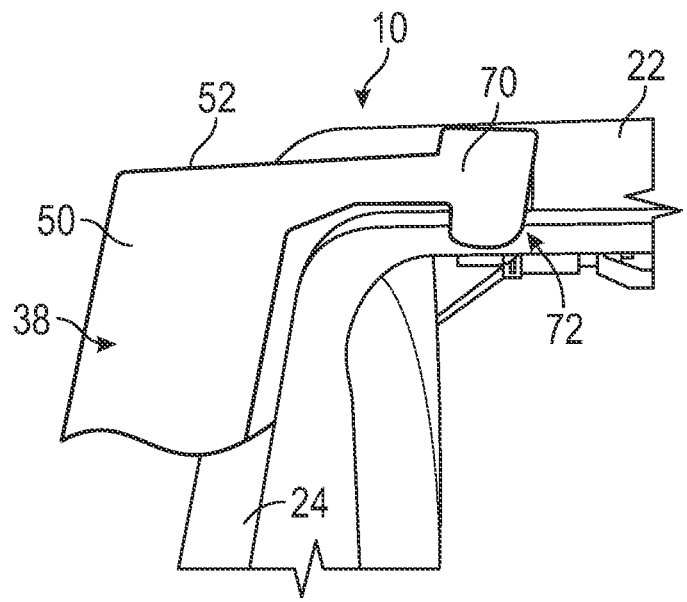
FIG. 5 illustrates another exemplary mounting configuration of a side view mirror assembly.

An upper section 50 of the stationary mirror housing section 38 may be supported by the A-pillar 24 of the vehicle static body structure 18. The upper section 50 may extend along a majority of the length of the A-pillar 24. In an embodiment, a top surface 52 of the upper section 50 extends to a position adjacent to the roof header 22 of the vehicle 10. If a more stable mounting configuration is either desired or required, the stationary mirror housing section 38 may include an inboard mount 66 configured for mounting to an inboard portion 68 of the A-pillar 24 (see FIG. 4), an upper mount 70 that extends from the upper section 50 and is configured for mounting to a ditch molding 72 of the roof header 22 (see FIG. 5), or both.

The side view mirror assembly 12 may include a plurality of mirrors for viewing vehicle surroundings during both on-road driving conditions and off-road driving conditions. In an embodiment, a first mirror 54 is secured to a rear-facing side 56 of the stationary mirror housing section 38 and may be used during both on-road and off-road driving conditions, a second mirror 58 is secured to a first side 60 of the movable mirror housing section 40 and may be used primarily during on-road driving conditions, and a third mirror 62 is secured to a second side 64 of the movable mirror housing section 40 and may be used primarily during off-road driving conditions. In the illustrated embodiment, the first side 60 is rear-facing and the second side 64 is forward-facing when the movable mirror housing section 40 is positioned in the first position P1. When the movable mirror housing section 40 is positioned in the second position P2, the third mirror 62 establishes a lower, rear-facing mirror of the stationary mirror housing section 38 for use during the off-road driving conditions.

The side view mirror assembly 12 may be a powered device. For example, the side view mirror assembly 12 may include one or more power mechanisms (motors, actuators, etc.) for moving the arm 42 and/or one or more of the mirrors 54, 58, 62 relative to their respective housing sections. An electric conduit 74 (see FIG. 4) may be routed through portions of the stationary mirror housing section 38 and/or the movable mirror housing section 40 and into a dry area 76 of the vehicle 10. In an embodiment, the dry area 76 is located beneath a hood 78 of the vehicle 10. The electric conduit 74 may be attached to applicable power and control conduits (not shown) to power and control the various power mechanisms of the side view mirror assembly 12.

When packaged on the passenger side 14 of the vehicle 10, the side view mirror assembly 12 may be equipped with a snorkel intake duct 80. The snorkel intake duct 80 may be mounted to the stationary mirror housing section 38. An air intake opening 82 may be formed through a forward-facing side 84 of the stationary mirror housing section 38. The snorkel intake duct 80 is fluidly connected to the air intake opening 82, such as via one or more hollow sections of the stationary mirror housing section 38. In situations in which the vehicle 10 is at least partially submerged in a body of water during off-roading driving conditions, airflow may be supplied to an internal combustion engine of the vehicle 10 by the snorkel intake duct 80.

In an embodiment, the snorkel intake duct 80 is an external duct mounted to a fender 86 of the vehicle 10 (shown schematically using dashed lines in FIGS. 2-3). In another embodiment, the snorkel intake duct 80 is an internal duct extending under the hood 78 of the vehicle 10 (shown schematically using dashed lines in FIGS. 2-3).

Figure 6:
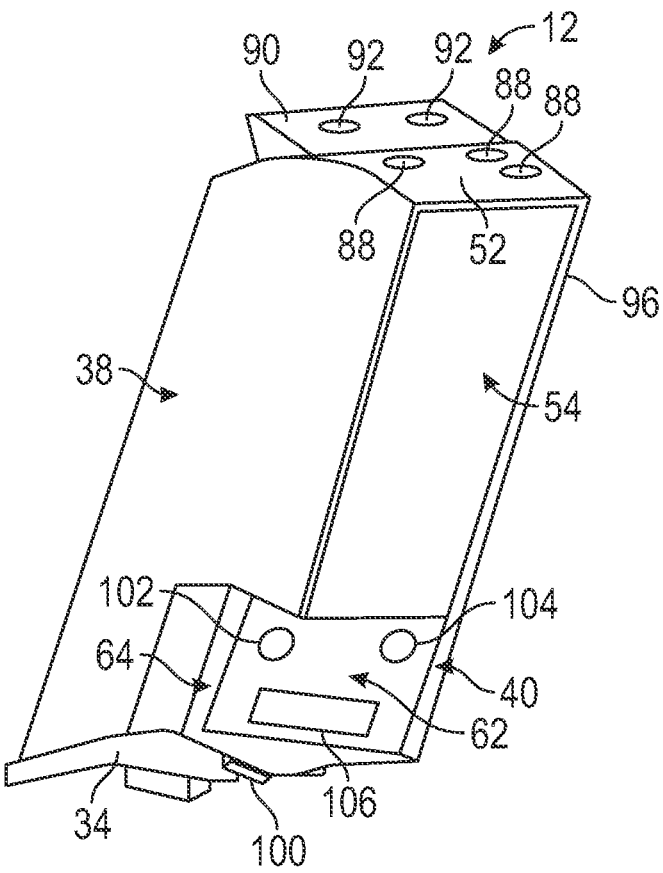
FIG. 6 is a rear view of an exemplary vehicle side view mirror assembly.
Figure 7:
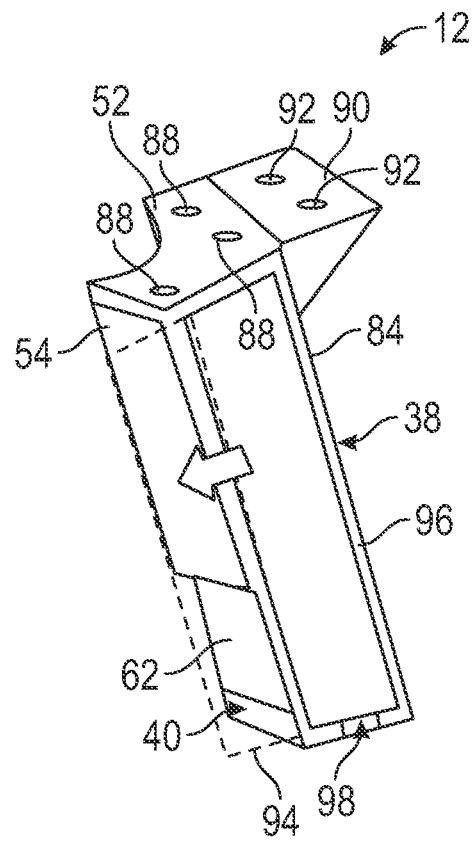
FIG. 7 is a side view of the side view mirror assembly of FIG. 6.

FIGS. 6 and 7, with continued reference to FIGS. 1-5, illustrate additional features of the side view mirror assembly 12. The top surface 52 of the stationary mirror housing section 38 of the side view mirror assembly 12 may establish an accessory mounting platform for securing one or more accessory items (e.g., lights, cameras, antennas, flags, etc.) to the vehicle 10. One or more mounting openings 88 may be formed in the top surface 52. Each mounting opening 88 may receive a fastener (e.g., a bolt, screw, etc.) for securing accessory devices to the side view mirror assembly 12.

Cameras, lights, antennas, and flags are non-limiting examples of the types of accessory items that could be mounted to the top surface 52 of the stationary mirror housing section 38 of the side view mirror assembly 12. Therefore, as would be readily understood by persons of ordinary skill in the art, any desired type of accessory item could be mounted to the vehicle 10 via the mounting platform established by the top surface 52.

The stationary mirror housing section 38 may include a visor 90. The visor 90 may extend from the forward-facing side 84 of the stationary mirror housing section 38. The air intake opening 82 may be disposed within the visor 90. One or more additional mounting openings 92 may be provided on the visor 90 for securing additional accessory items.

The side view mirror assembly 12 may additionally include a wind wing 94 that is slidably mounted to the stationary mirror housing section 38. In an embodiment, the wind wing 94 is mounted to an outboard side 96 of the stationary mirror housing section 38. The wind wing 94 may be slid in a rearward direction to protect vehicle occupants from sprayed dust, mud, water, sand, etc. when the vehicle 10 is being operated with the side doors 20 of the vehicle 10 removed. In an embodiment, the wind wing 94 is made of a translucent material so as not to impede with driver or passenger visibility.

The side view mirror assembly 12 may additionally include various electrical features such as, for example, one or more turn signal repeaters 98 and floodlights 100. The electrical features are shown and described by way of example, and other electrical features such as, for example, a mirror defroster, a puddle lamp, and/or any other electrical features for complementing operation of the vehicle 10 and the side view mirror assembly 12. The side view mirror assembly 12 could alternatively include no lights within the scope of this disclosure. In the illustrated embodiment, the electrical features are shown as part of the stationary mirror housing section 38, however, similar features could alternatively or additionally be incorporated into the movable mirror housing section 40.

The movable mirror housing section 40 may be equipped with one or more spotlights 102, cameras 104, and radar sensors 106. The spotlight 102, camera 104, and radar sensor 106 may be mounted at the second side 64 of the movable mirror housing section 40 and therefore face rearward when the movable mirror housing section 40 is positioned in the second position P2 and face forward when the movable mirror housing section 40 is positioned in the first position P1. The spotlight 102, camera 104, and radar sensor 106 may therefore be utilized to monitor the forward and/or rear environments surrounding the vehicle 10.

Figure 8:
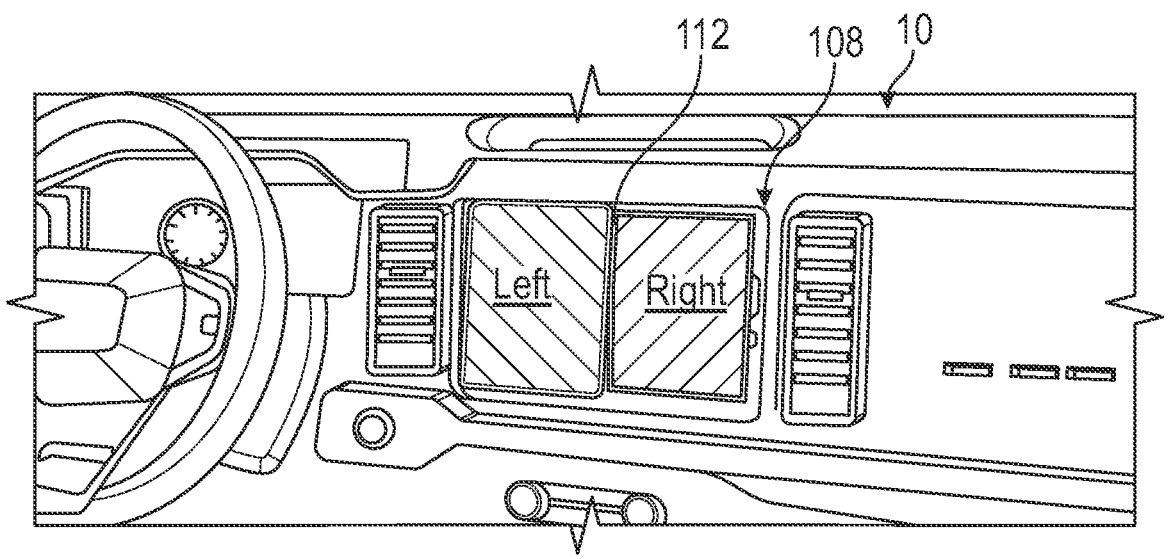
FIG. 8 illustrates a human machine interface of a vehicle equipped with side view mirror assemblies.

A user can selectively control the spotlight 102 via a human machine interface 108 (see FIG. 8) located within a passenger cabin of the vehicle 10 for achieving directed lighting about the vehicle 10. The camera 104 is configured for capturing images in and around the vehicle 10. In an embodiment, the spotlight 102 is aimed in the same direction as the camera 104 in order to improve the quality of the images recorded by the camera 104.

The camera 104 may be any type of camera. In an embodiment, the images captured by the camera 104 may be displayed on a display 112 of the human machine interface 108 (see FIG. 8). Where the vehicle 10 includes both a driver and a passenger side view mirror assembly 12, the images captured by the cameras 104 may be displayed in a side-by-side configuration on the display 112.

The radar sensor 106 may be any type of radar sensor and could be a single sensor or an arrangement of sensors or sensing devices for performing various vehicle-related radar functions. In an embodiment, the radar sensor 106 is a frequency modulated continuous wave (FMCW) radar sensor. In another embodiment, the radar sensor 106 operates in the 60-GHz to 64-GHz band. However, other radar sensors may also be suitable within the scope of this disclosure.

Figure 9:
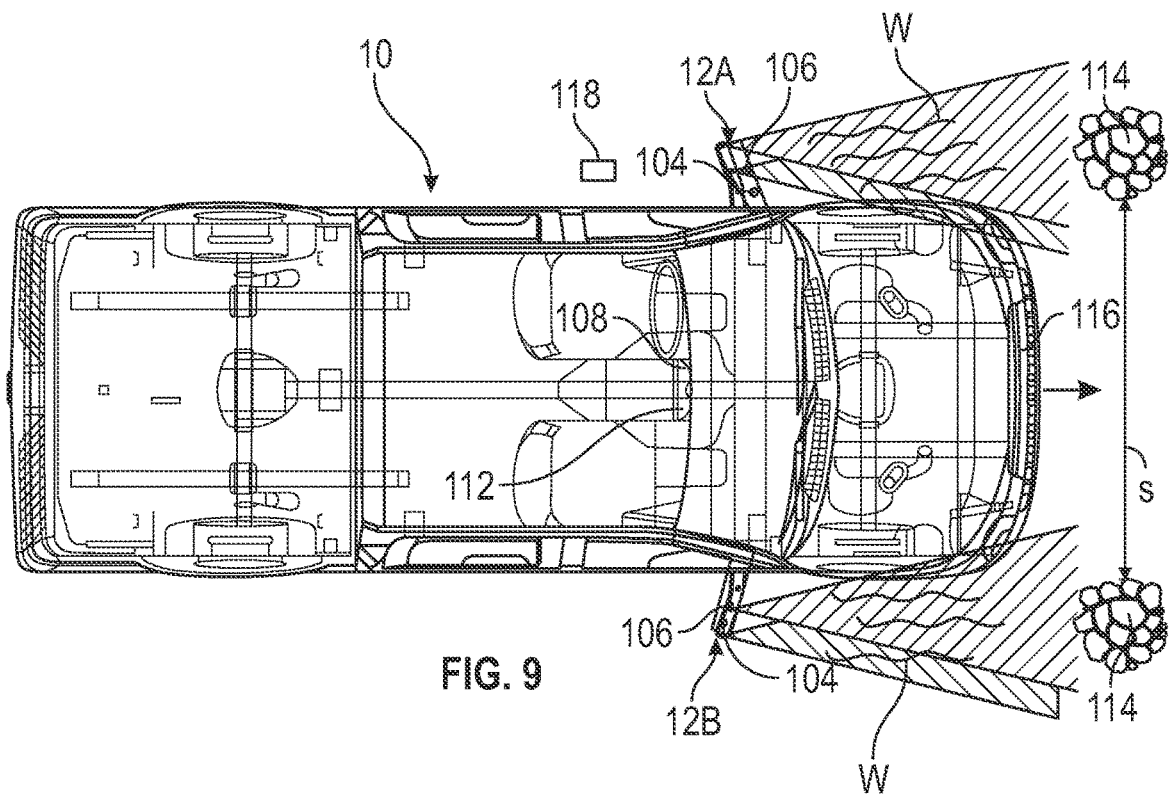
FIG. 9 schematically illustrates radar features of a vehicle equipped with side view mirror assemblies.

FIG. 9 schematically illustrates numerous radar-related functions of the vehicle 10. In the illustrated embodiment, the vehicle 10 includes both a driver side view mirror assembly 12A and a passenger side view mirror assembly 12B. The driver side view mirror assembly 12A and the passenger side view mirror assembly 12B may both include a design similar to the side view mirror assembly 12 of FIGS. 6-7. The passenger side view mirror assembly 12B could optionally include snorkel-related features, however, the driver side view mirror assembly 12A typically does not include snorkel-related features.

In an embodiment, the radar sensors 106 of the driver side view mirror assembly 12A and the passenger side view mirror assembly 12B are configured to determine whether there is an adequate amount of space S between objects 114 (e.g., boulders, trees, logs, etc.) positioned in a traveling path of the vehicle 10. The radar sensors 106 may provide for an alert when an insufficient amount of space S extends between the objects 114 or may provide instructions at the display 112 of the human machine interface 108 for guiding the driver for better maneuvering the vehicle 10 through the space S. Images captured by the cameras 104 may also be displayed on the display 112 during the maneuvering to allow the driver to steer clear of the objects 114 and avoid any scrapes or damage to the tires, fenders, etc.

In another embodiment, the radar sensors 106 of the driver side view mirror assembly 12A and the passenger side view mirror assembly 12B are configured to determine a distance to the ground or water W beneath the vehicle 10 on each side of the vehicle 10 and display such distance on the display 112. A radiator fan 116 can be temporarily stopped when the water W is above a certain height to avoid spraying water into the engine compartment.

In another embodiment, when the vehicle 10 is configured in a doors-off mode, the radar sensors 106 of the driver side view mirror assembly 12A and the passenger side view mirror assembly 12B may be configured to detect when an object 118 falls out of vehicle 10 during travel. An alarm can be triggered when the radar sensors 106 detect the object 118.

In another embodiment, the radar sensors 106 of the driver side view mirror assembly 12A and the passenger side view mirror assembly 12B may be configured to augment or replace a blind spot radar system of the vehicle 10.

Figure 10:
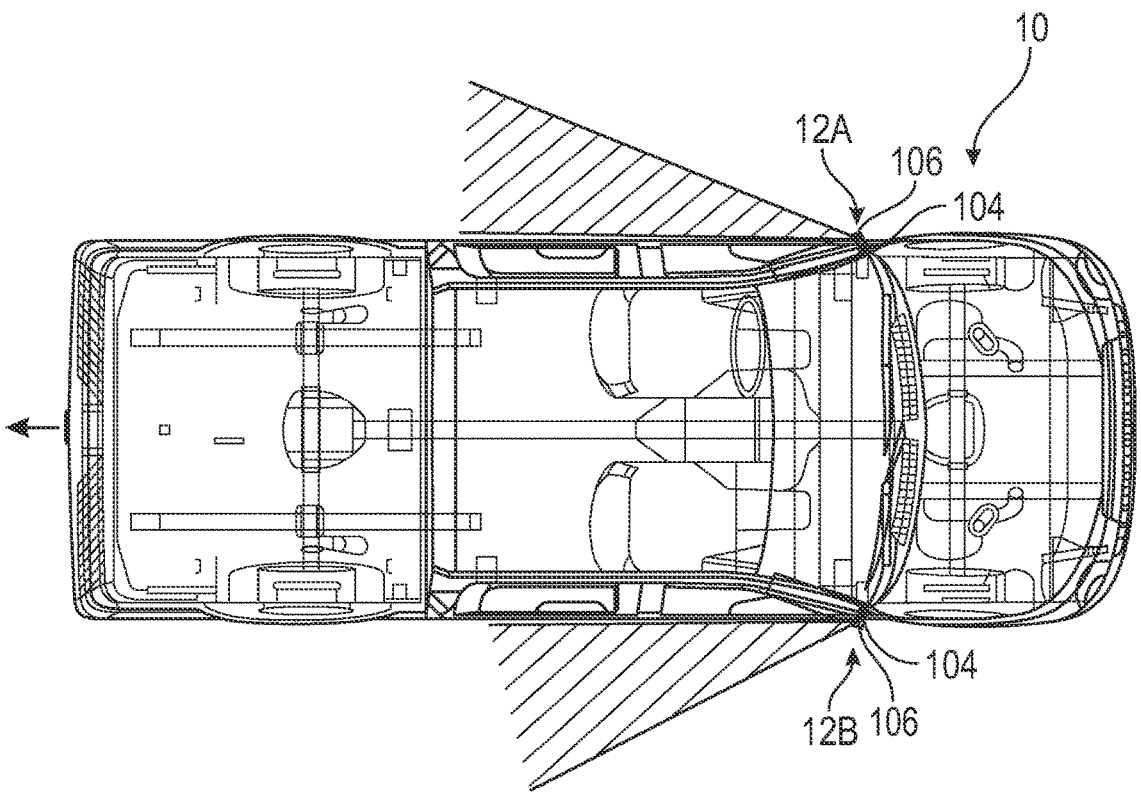
FIG. 10 schematically illustrates additional radar features of a vehicle equipped with side view mirror assemblies.

In yet another embodiment, shown in FIG. 10, when the vehicle 10 is operating in a reverse gear, the driver side view mirror assembly 12A and the passenger side view mirror assembly 12B may be automatically moved to the second, off-road driving position P2. In this position, the radar sensors 106 and the cameras 104 may function as a back-up driving assistance system to the driver, such as when backing the vehicle 10 up at a boat ramp, for example.

Figure 11:
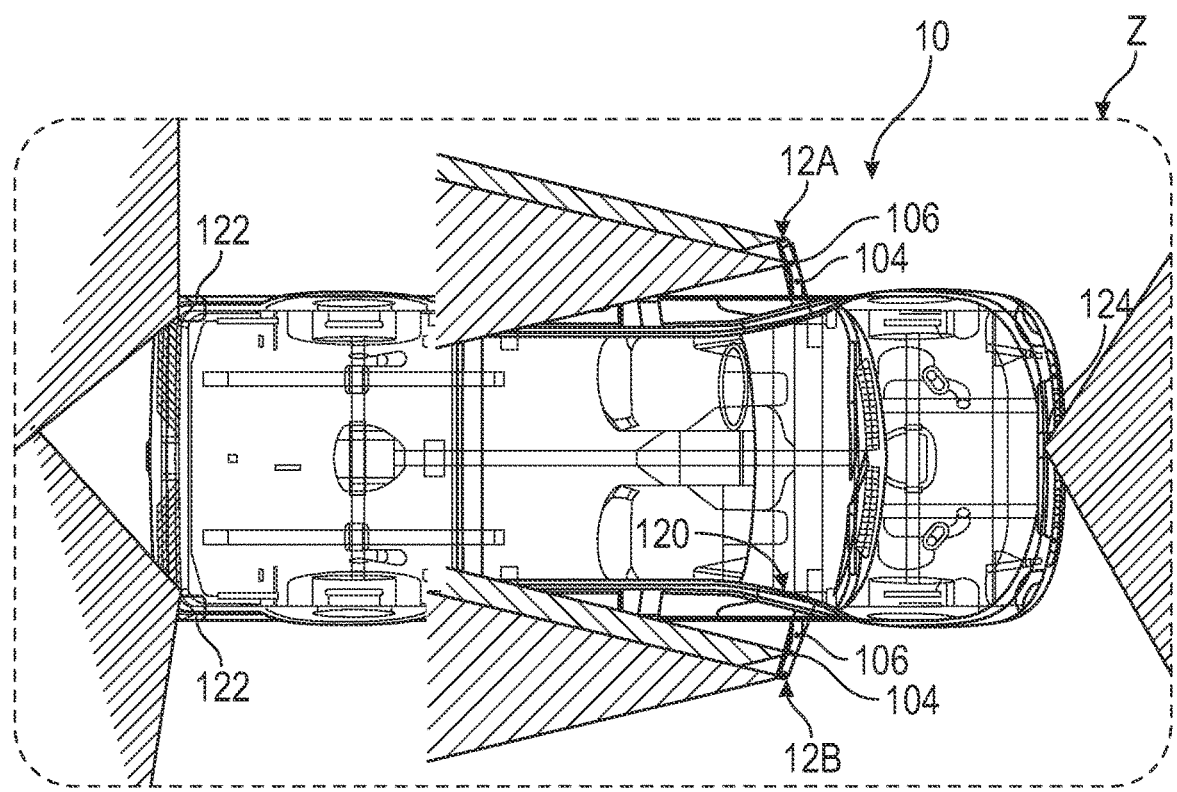
FIG. 11 schematically illustrates a vehicle security system.

Referring now to FIG. 11, the radar sensors 106 and cameras 104 of the driver side view mirror assembly 12A and the passenger side view mirror assembly 12B may be part of a security system 120 of the vehicle 10. The security system 120 may include one or more additional radar sensors 122 located at the rear of the vehicle 10 and one or more additional radar sensors 124 located at the front of the vehicle 10. In an embodiment, the radar sensors 122 may be taillight mounted blind spot information system (BLIS) radar sensors, and the radar sensors 124 may be front-end mounted advanced driver assistance system (ADAS) radar sensors. The radars sensors 106, 122, and 124 may monitor all four sides of the vehicle 10.

In an embodiment, when the vehicle 10 is in a park gear and in a doors-off mode, for example, the driver side view mirror assembly 12A and the passenger side view mirror assembly 12B automatically be moved to a half-folded position (i.e., a position between the first and second positions P1, P2 of FIGS. 1-3). In this position, the radar sensors 106 may be configured to include a 180 degree field of view at the sides of the vehicle 10. In combination with the radar sensors 122, 124, the security system 120 may establish a 360 degree security protection zone Z about the vehicle 10, thereby guarding against thieves approaching and stealing items from the interior of the vehicle 10 without an alarm being triggered.

Figure 12:
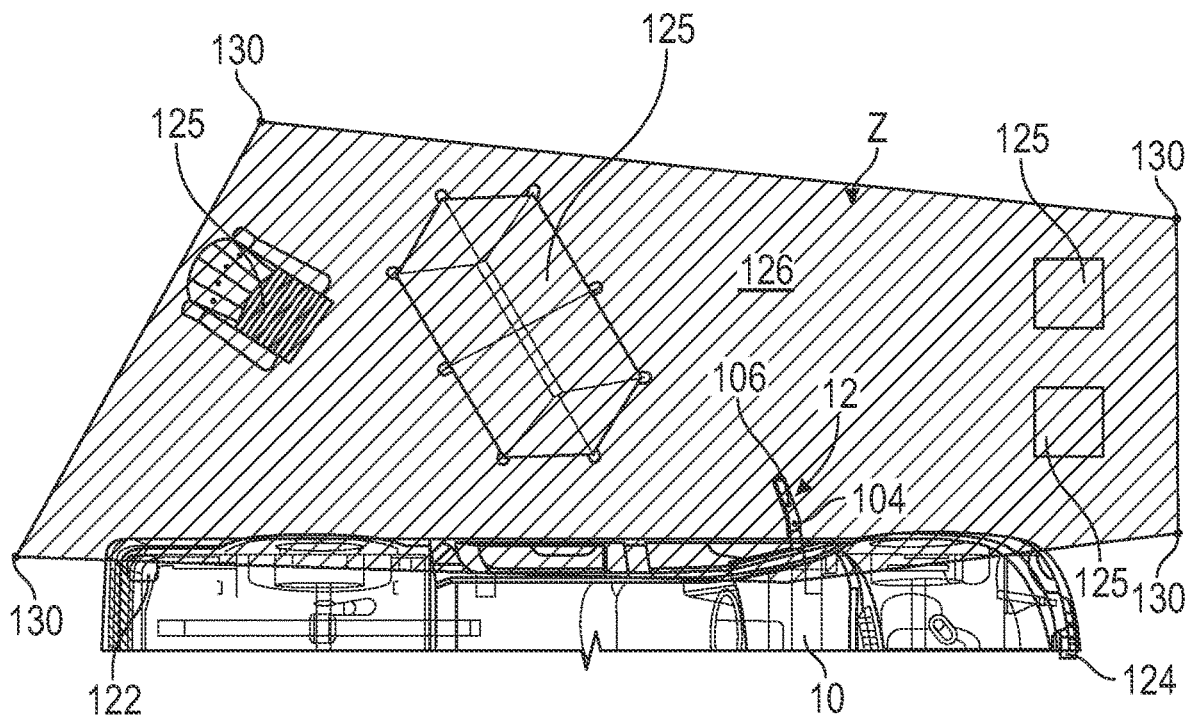
FIG. 12 schematically illustrates an exemplary use of the vehicle security system of FIG. 11 for securing a perimeter outside of the vehicle.
Figure 13:
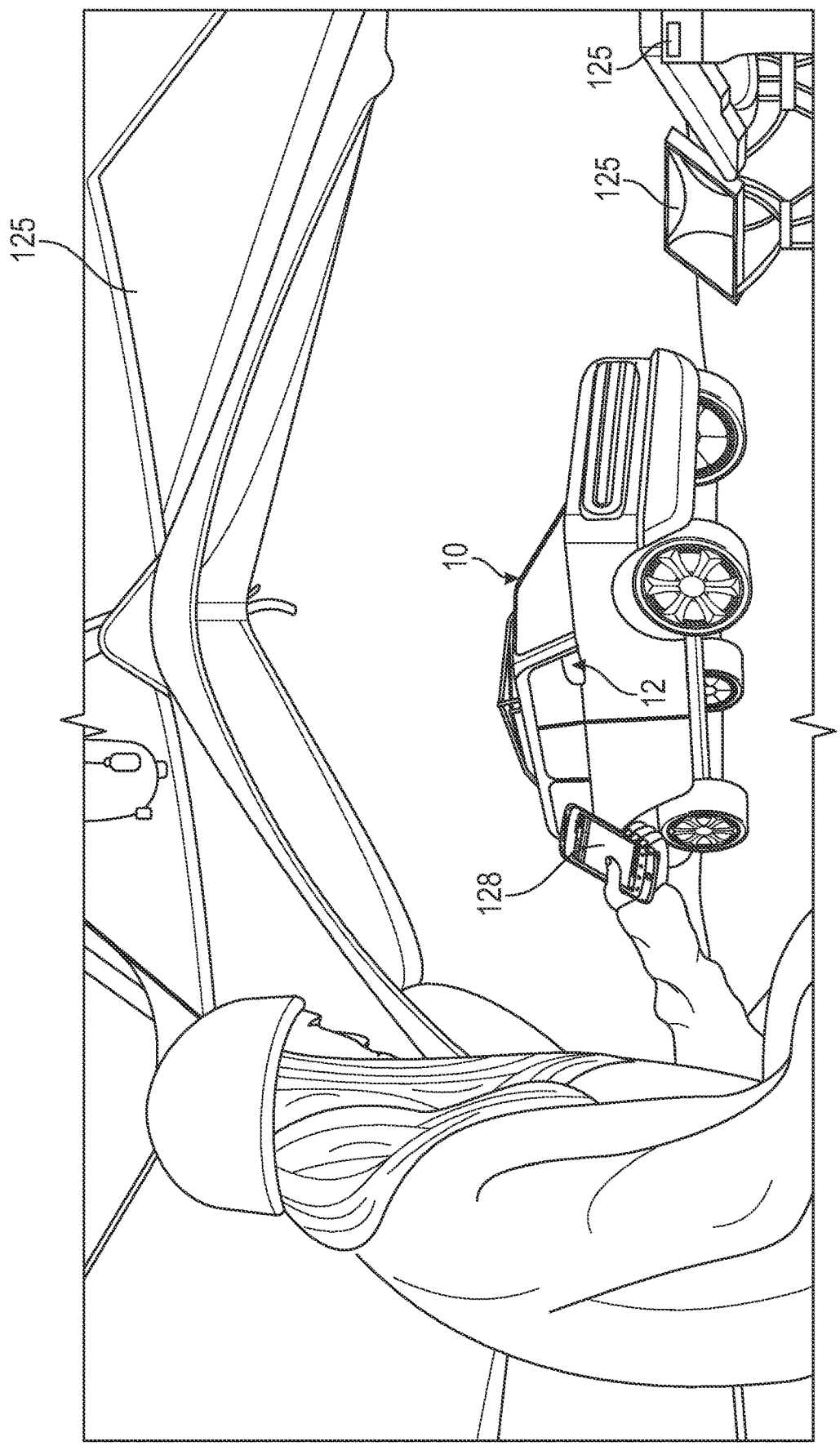
FIG. 13 schematically illustrates a user controlling the vehicle security system of FIGS. 11 and 12 with a smart device.

FIG. 12 illustrates additional security-related functionality of the security system 120 of FIG. 11. One or more of the radar sensors 106, 122, and 124 may be configured to establish a security protection zone Z at a site 126 (e.g., a campsite or tailgating site) near the vehicle 10 for protecting various items 125 (e.g., tent, camping equipment, chairs, grills, etc.) located at the site 126 from theft. Using a smart device 128 (e.g., a smart phone, see FIG. 13) that is equipped with an appropriate web-based application that is configured to communicate with the vehicle 10, a user may select a plurality of perimeter points 130 that establish an outer perimeter of the security protection zone Z. The security protection zone Z allows the user to monitor the site 126 even when away from the site 126 or when sleeping.

In an embodiment, an alarm may be automatically triggered at the smart device 128 and/or the vehicle 10 when an intruder is detected within the security protection zone Z. The cameras 104 may record images when the intruder is detected. The recorded images may be transmitted to the user via the application on the smart device 128.

The vehicle body mounted side view mirror assemblies of this disclosure include integrated features for supporting off-roading and improved vehicle security. The exemplary side view mirror assemblies therefore provide for a "doors-off" open air riding experience in which the mirrors are still available for use on the vehicle while also offering a multitude of enhanced off-roading and security features.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A side view mirror assembly for a vehicle, comprising:
a stationary mirror housing section mounted to a vehicle static body structure and including a first mirror; and
a movable mirror housing section movably mounted to the stationary mirror housing section and including a second mirror,
wherein the movable mirror housing section is movable between a first, on-road driving position and a second, off-road driving position relative to the stationary mirror housing section,
wherein the second mirror is rear-facing relative to the vehicle when in the first, on-road driving position and is forward-facing relative to the vehicle when in the second, off-road driving position.

2. The side view mirror assembly as recited in claim 1, wherein a bracket located at a base of the stationary mirror housing section is mounted at a first portion of the vehicle static body structure and an upper section of the stationary mirror housing section is mounted at a second portion of the vehicle static body structure.

3. The side view mirror assembly as recited in claim 1, wherein the movable mirror housing section is movably mounted to the stationary mirror housing section by a pivotable and telescoping arm.

4. A side view mirror assembly for a vehicle, comprising:
a stationary mirror housing section mounted to a vehicle static body structure and including a first mirror; and
a movable mirror housing section movably mounted to the stationary mirror housing section and including a second mirror,
wherein the movable mirror housing section is movable between a first, on-road driving position and a second, off-road driving position relative to the stationary mirror housing section,
wherein the movable mirror housing section includes a third mirror, and further wherein the third mirror is forward facing when the movable mirror housing section is positioned in the first, on-road driving position and establishes a lower, rear-facing mirror of the stationary mirror housing section when the movable mirror housing section is positioned in the second, off-road driving position.

5. The side view mirror assembly as recited in claim 1, wherein a top surface of the stationary mirror housing section establishes an accessory mounting platform that includes a plurality of mounting openings.

6. The side view mirror assembly as recited in claim 1, comprising a snorkel intake duct attached to the stationary mirror housing section, wherein the snorkel intake duct is in fluid communication with an air intake opening formed in the stationary mirror housing section.

7. The side view mirror assembly as recited in claim 1, comprising a wind wing slidably mounted to the stationary mirror housing section.

8. The side view mirror assembly as recited in claim 1, comprising a turn signal repeater or a floodlight provided on the stationary mirror housing section or the movable mirror housing section.

9. The side view mirror assembly as recited in claim 1, comprising a spotlight and a camera provided on the movable mirror housing section.

10. The side view mirror assembly as recited in claim 1, comprising a radar sensor provided on the movable mirror housing section.

11. A vehicle comprising the side view mirror assembly of claim 1, wherein the vehicle static body structure includes an A-pillar, a hinge pillar, a fender support, and a cowl structure, and further wherein the side view mirror assembly is mounted at joint interface between the A-pillar, the hinge pillar, the fender support, and the cowl structure.

12. The vehicle as recited in claim 11, wherein a bracket located at a base of the stationary mirror housing section is mounted at the joint interface, and an upper section of the stationary mirror housing section is mounted to the A-pillar.

13. The side view mirror assembly as recited in claim 1, wherein the second mirror is concealed when the movable mirror housing section is positioned in the second, off-road driving position.

14. The side view mirror assembly as recited in claim 2, wherein the upper section of the stationary mirror housing section extends along a majority of a length of an A-pillar of the vehicle static body structure.

15. The side view mirror assembly as recited in claim 14, wherein the upper section includes a top surface that extends to a position adjacent to a roof header of the vehicle.

16. The side view mirror assembly as recited in claim 1, comprising an electric conduit routed through the stationary mirror housing section or the movable mirror housing section and into a dry area of the vehicle.

17. The side view mirror assembly as recited in claim 1, wherein the stationary mirror housing section includes a visor that extends from a forward-facing side of the stationary mirror housing section.

18. The side view mirror assembly as recited in claim 9, comprising a human machine interface having a display that is configured to display images captured by the camera in a side-by-side configuration.

19. The side view mirror assembly as recited in claim 10, wherein the radar sensor is configured to monitor a perimeter around the vehicle when the vehicle is in park and in a doors-off condition.

20. A side view mirror assembly for a vehicle, comprising:
a stationary mirror housing section including a first mirror; and
a movable mirror housing section pivotably movable between a first position and a second position relative to the stationary mirror housing section and including a second mirror secured to a first side of the movable mirror housing section and a third mirror secured to a second side of the movable mirror housing section,
wherein the first side of the movable mirror housing section is rear-facing and the second side of the movable mirror housing section is forward-facing when in the first position,
wherein the first side of the movable mirror housing section is forward-facing and the second side of the movable mirror housing section is rear-facing when in the second position.

* * * * *